United States Patent [19]
Belot et al.

[11] 3,897,201
[45] July 29, 1975

[54] PROCESS AND DEVICE FOR PREHEATING MOULDS

[75] Inventors: Pierre Belot, Pont-A-Mousson; Maurice Perrain, Nancy, both of France

[73] Assignee: Pont-A-Mousson S.A., Pont-A-Mousson, France

[22] Filed: Feb. 27, 1974

[21] Appl. No.: 446,432

[30] Foreign Application Priority Data
Mar. 29, 1973 France .............................. 73.11304

[52] U.S. Cl. .................. 432/4; 264/53; 264/54; 432/9
[51] Int. Cl.² ...................... F27D 7/00; F27D 13/00
[58] Field of Search ................ 264/53, 54; 432/4, 9

[56] References Cited
UNITED STATES PATENTS
| | | | |
|---|---|---|---|
| 2,951,260 | 9/1960 | Harrison et al. | 264/DIG. 10 |
| 3,129,464 | 4/1964 | Heider | 264/53 X |
| 3,139,272 | 6/1964 | Couchman | 432/266 X |
| 3,264,381 | 8/1966 | Stevens | 264/53 X |
| 3,347,961 | 10/1967 | Russell | 432/13 X |

Primary Examiner—John J. Camby
Attorney, Agent, or Firm—Sughrue, Rothwell, Mion, Zinn & Macpeak

[57] ABSTRACT

Process for the steam moulding of parts of expanded thermoplastic material. In this process, there is supplied to the steam chamber surrounding the mould first hot air for preheating the mould before the supply of steam to the steam chamber.

A moulding press is described for carrying out the process.

4 Claims, 1 Drawing Figure

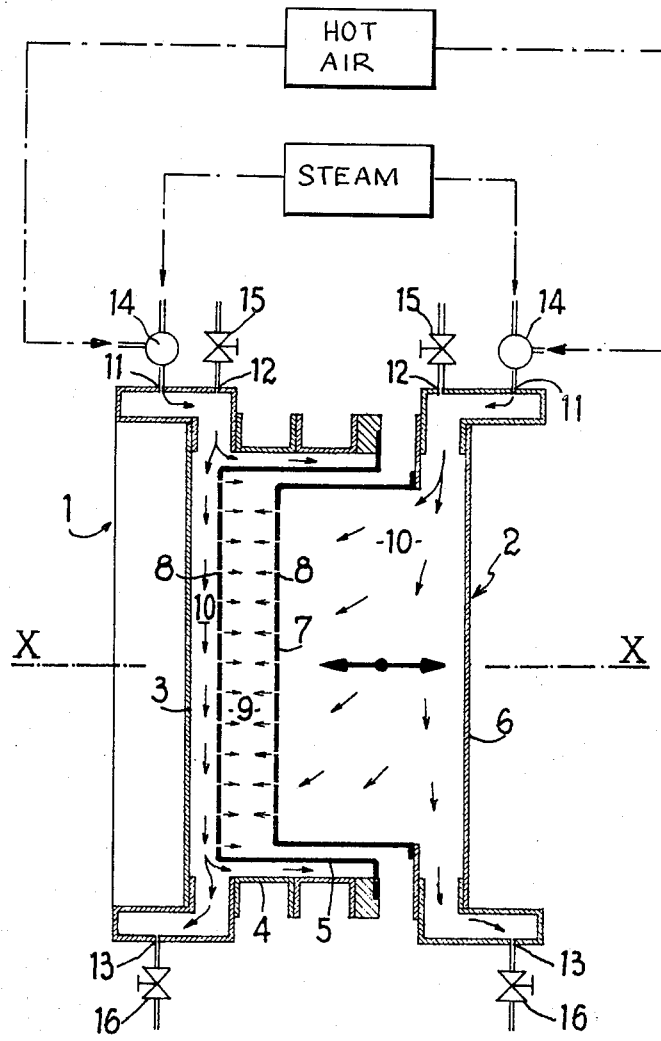

PROCESS AND DEVICE FOR PREHEATING MOULDS

The present invention relates to the steam moulding of parts of expanded thermoplastic materials and more particularly concerns processes for preheating the moulds employed in this manufacture and the devices for carrying out these processes.

The moulds employed in the aforementioned moulding operations are surrounded by an annular chamber or steam chamber into which there is injected superheated water vapour or steam as soon as the mould is filled with the thermoplastic material to be expanded and moulded. This steam enters the mould through small orifices or vents and produces the desired expansion.

It is known to preheat the walls of the mould prior to the introduction of the thermoplastic material into the mould.

The preheating processes usually employed comprise, prior to the feeding of the thermoplastic product to the mould, supplying superheated steam to the steam chamber and therefore, for reasons of convenience, employing the thermoplastic-expanding agent also as the preheating agent.

However, these processes have a serious drawback: in the course of the preheating, a part of the steam enters the mould by way of the vents and condenses on the internal walls. It is therefore necessary, before introducing the material to be moulded, to dry these walls, for example by blowing air. The latter operation results in loss of time and moreover substantially cools the mould and therefore reduces the effect of the preheating.

An object of the present invention is to overcome this drawback and to provide a process for preheating a mould employed for the steam moulding of parts of expanded thermoplastic material, comprising supplying hot air to a chamber, termed the steam chamber, surrounding the mould.

Another object of the invention is to provide a moulding press, for carrying out such a process, comprising a mould surrounded by a steam chamber, wherein the steam chamber is provided with orifices whereby hot air can be blown into the chamber.

Further features and advantages of the invention will be apparent from the ensuing description with reference to the accompanying drawing.

In the drawing:

The single FIGURE is a diagrammatic sectional view of a moulding press according to the invention for the aforementioned first manner of carrying out the process.

The press comprises in the known manner a fixed part 1 integral with a frame (not shown) and a movable part 2 which is movable in translation with respect to the fixed part along a horizontal axis X—X.

The fixed part 1 has a fixed plate 13 which extends in a direction perpendicular to the axis X—X and carries, for example, two detachable raised parts 4, a semi-mould 5. The movable part 2 comprises a movable plate 6 which extends in a direction perpendicular to the axis X—X and carries a second semi-mould 7. The two semi-moulds have walls provided with orifices or vents 8 and they define therebetween a moulding cavity 9.

Provided between each plate and the corresponding semi-mould is a steam space or chamber 10. Each of these chambers is provided with three orifices 11, 12 and 13 which are respectively connected to valves 14, 15 and 16. Orifices 11 and 12 constitute inlet means and are located in the upper part of the steam chamber 10. The valve 14 has two inlets one of which is connected to a source of superheated steam and the other inlet is connected to a source of hot air so that the valve 14 permits sending into the chamber 10 either hot air for the preheating of the mould or superheated steam in the course of the stage for expanding the material to be moulded. The valves 15 combined with the orifices 12 constituting outlets are only employed in the course of the lastmentioned stage and permit the discharge of the steam injected by way of the valves 14. The orifice or outlet 13 is located in the lower part of the chamber 7 and the valve 16 permits the discharge of a part of the hot air coming from the valve 14 in the course of the preheating of the mould, the remainder of this hot air being discharged by way of the vents or orifices 8. The orifice 13 also serves in the expansion stage to discharge the condensate due to the circulation of the steam injected by way of the valve 14.

Having now described our invention what we claim as new and desire to secure by Letters Patent is:

1. In a process for the steam moulding of parts from expanded thermoplastic material in a mould having a mould cavity defined by walls comprising a wall having a plurality of orifices which put the cavity in communication with a steam chamber to ensure a substantially even distribution of steam in the cavity; the improvement characterized by: preheating the walls of the cavity prior to the supply of steam to said chamber for moulding, by supplying hot air to said chamber which air enters said cavity by way of said orifices.

2. A moulding press for moulding parts from expanded thermoplastic material by putting steam in contact with said material, comprising in combination: a mould having walls defining a mould cavity, a steam chamber adjoining a wall of the mould cavity, a plurality of throughway orifices in said wall arranged substantially throughout said wall for distributing steam from said chamber in said cavity, a source of steam, a source of hot air, inlet means putting said chamber in communication with said steam source and with said hot air source, first valve means combined with said inlet means for permitting first the supply of hot air to said chamber to preheat the mould cavity walls prior to the supply of steam to said chamber and thereafter the supply of steam to said chamber, outlet means for connecting said chamber to a discharge and second valve means controlling said outlet means.

3. A press as claimed in claim 2, comprising a valve connected to each of said orifices, each valve having a double input for selective connection of the orifices to a hot air supply source and to a steam supply source.

4. A press as claimed in claim 2, wherein the mould is constituted by two semi-moulds which are movable with respect to each other, each semi-mould having a wall with a plurality of steam-distributing orifices and defining a part of the mould cavity, there being two of said steam chambers respectively adjoining the two walls with said orifices and communicating with the mould cavity via said orifices, each chamber having said inlet means, said first valve means, said outlet means and said second valve means.

* * * * *